US012588781B2

(12) United States Patent　　(10) Patent No.:　US 12,588,781 B2

Ritchie　　(45) Date of Patent:　Mar. 31, 2026

(54) COMBINATION FIRE PIT, GRILL, PIZZA OVEN AND COOKING WOK

(71) Applicant: Mark P. Ritchie, San Marcos, CA (US)

(72) Inventor: Mark P. Ritchie, San Marcos, CA (US)

(*) Notice: Subject to any disclaimer, the term of this patent is extended or adjusted under 35 U.S.C. 154(b) by 575 days.

(21) Appl. No.: 17/943,414

(22) Filed: Sep. 13, 2022

(65) Prior Publication Data

US 2024/0041254 A1　　Feb. 8, 2024

Related U.S. Application Data

(63) Continuation-in-part of application No. 29/848,947, filed on Aug. 6, 2022.

(51) Int. Cl.
| | |
|---|---|
| *A47J 36/10* | (2006.01) |
| *A47J 37/06* | (2006.01) |
| *F24C 3/08* | (2006.01) |
| *F24C 3/12* | (2006.01) |
| *F24C 15/14* | (2006.01) |

(52) U.S. Cl.
CPC ........... *A47J 37/0664* (2013.01); *A47J 36/10* (2013.01); *A47J 37/0647* (2013.01); *A47J 37/0658* (2013.01); *F24C 3/085* (2013.01); *F24C 3/126* (2013.01); *F24C 15/14* (2013.01)

(58) Field of Classification Search
CPC .... A47J 37/0664; A47J 36/10; A47J 37/0647; A47J 37/0658; F24C 3/085; F24C 3/126; F24C 15/14; F24C 1/02; F24C 3/08; F24C 3/12; F24B 1/1802; F24B 3/00

USPC .......................................................... 126/41
See application file for complete search history.

(56) References Cited

U.S. PATENT DOCUMENTS

| | | | | |
|---|---|---|---|---|
| 1,919,898 | A * | 7/1933 | Martin ...................... | F24C 1/16 |
| | | | | 126/262 |
| 6,892,722 | B1 * | 5/2005 | Francies, III ....... | A47J 37/0786 |
| | | | | 126/25 R |
| 6,962,106 | B2 * | 11/2005 | Viraldo ............... | A47J 37/0704 |
| | | | | 99/449 |
| 10,588,456 | B2 * | 3/2020 | Jenkins ................... | F24C 3/027 |
| 10,687,666 | B2 * | 6/2020 | Bucklew ............. | A47J 37/0763 |
| 2014/0311356 | A1 * | 10/2014 | Daniels ............... | A47J 37/0713 |
| | | | | 99/340 |

* cited by examiner

*Primary Examiner* — Avinash A Savani

(74) *Attorney, Agent, or Firm* — Richard D. Clarke

(57)　　　　　　ABSTRACT

The present application is directed to a Combination Fire Pit, Grill, Pizza Oven and Cooking Wok. More particularly, a combination fire pit, grill, pizza oven and cooking wok assembly is provided in a single unit. When the combination fire pit, grill, pizza oven and cooking wok unit is in storage or being transported, the wok top is inverted and secured to the unit. When in use as a fire pit, the wok lid is taken off. When in use as a cooking wok, the cooking wok lid is taken off the unit, inverted to be cook-side up, then placed back on the unit when the cooking fire is started. When in use as a pizza oven, the cooking wok is left on the fire barrel in the upside down position covering a pizza stone. Alternatively, just the grill grate can be used to cook food items by grilling.

20 Claims, 8 Drawing Sheets

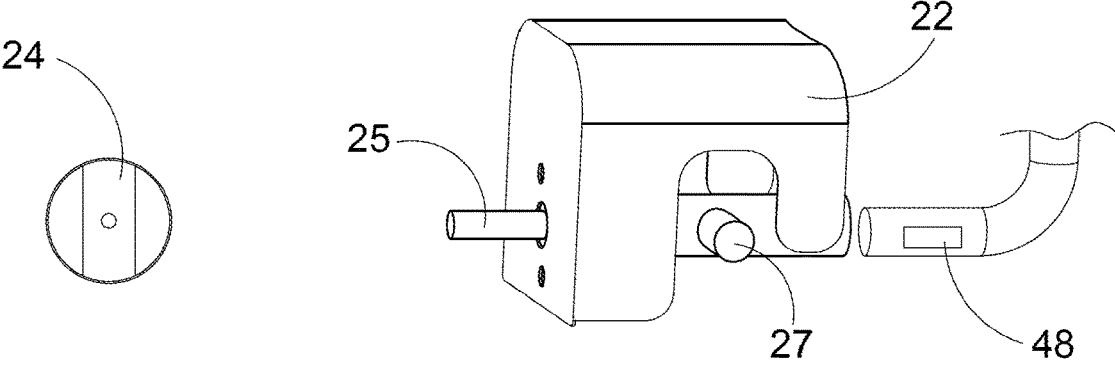
FIG. 3
FIG. 4
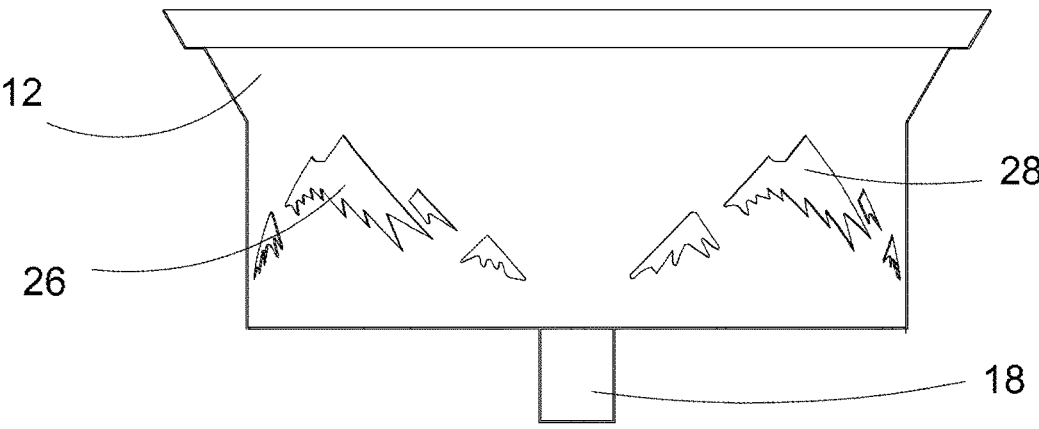
FIG. 5
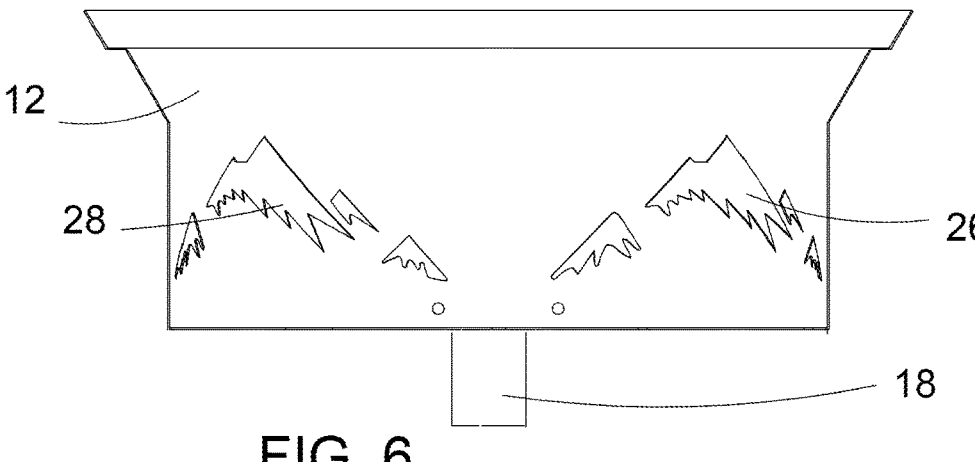
FIG. 6

20

20

54

55

32

30

38

41

33

COMBINATION FIRE PIT, GRILL, PIZZA OVEN AND COOKING WOK

FIELD OF THE INVENTION

This application relates to a combination fire pit, grill, pizza oven and cooking wok. More particularly, a combination fire pit, grill, pizza oven and cooking wok assembly is provided in a single compact portable unit having a liquid propane (LP) gas hose connection, a gas ignitor/control unit and control knob, a base frame for supporting a fire pit housing barrel, a fire pit housing barrel for holding pumice rocks and for supporting a grill grate, a burner ring housed within the fire pit housing barrel, and a grill grate, all topped with a wok lid with handles which is secured to the fire pit housing barrel using lid clamps. When the combination fire pit, grill, pizza oven and cooking wok unit is in storage or being transported, the wok top is inverted and secured to the unit. When in use as a fire pit, the wok lid is taken off and the grill grate removed. When in use as a cooking wok, the cooking wok lid is taken off the unit, inverted to be positioned cook-side up, then placed back on the unit when the cooking fire is started. When in use as a pizza oven, the cooking wok is left on the fire barrel in the upside down position acting as a lid. Alternatively, just the grill grate can be used to cook food items by grilling. In addition to using liquid propane (LP) as a power source, the combination fire pit, grill, pizza oven and cooking wok assembly could be used with a conventional wood or charcoal fire.

BACKGROUND OF THE INVENTION

Vehicle based camping has become popular over the years. People and families have been going camping in pick-up trucks, vans, sport utility vehicles (SUVs), and recreational vehicles (RVs) in growing numbers. While out camping and off the grid, it is sometimes a challenge to have a fire and cook food. This has made using liquid propane (LP) powered cooking stoves and grill a very popular choice for most campers. Having an LP based fire at the campsite eliminates the need for gathering firewood and it greatly cuts down on the smoke generated during the cooking process. Additionally, a gas powered fire can be turned on and off readily by the twist of a control knob, whereas a wood fire takes time to build and put out. Therefore, there is a growing need for a combination fire pit, cooking grill and cooking wok.

With the price of vehicle fuel rising lately, campers have been using their pick-up trucks and SUVs more and more to go camping. RVs which use excessive amounts of fuel are waning in popularity for the general public, and van conversions as well as smaller RVs and trailers are becoming the trend to get out and go camping. With these smaller vehicles being increasingly used for camping comes smaller cargo spaces for accommodating all of the camping gear. Having less space it is becoming more and more important to have camping gear which takes up less cargo space, or combination camping gear to accomplish multiple uses in one unit. It would be very advantageous to have the capability to have a fire pit fire, have a cooking grill, have a pizza oven and have a cooking wok all in one compact portable package. Therefore, there is a growing and long felt need for a combination fire pit, cooking grill, pizza oven and cooking wok.

In addition to camping, many more families are having fires, grilling and cooking outdoors at home. Folks increasingly are using fire pits and barbeque grills in their backyards, patios and outdoor spaces. Asian-style woks have become very popular for cooking foods of all types, mainly indoors on stoves and ranges, but there have been very few outdoor woks introduced to the public which have recently appeared on the market. Stand-alone pizza ovens are also increasing in popularity as more and more people are making their own pizzas at home. There are pizza ovens currently on the market, but they require temperatures of 600 degrees or more to successfully bake a pizza. This makes most stand-alone pizza ovens both expensive to purchase and expensive to run. It would be very advantageous to have the capability to have a fire pit fire, have a cooking grill, have a pizza oven and have a cooking wok all in one compact portable package. Therefore, there is a growing and long felt need for a combination fire pit, cooking grill, pizza oven and cooking wok.

In this respect, before explaining at least one embodiment of the Combination Fire Pit, Grill, Pizza Oven and Cooking Wok in greater detail, it is to be understood that the design is not limited in its application to the details of construction and to the arrangement of the components set forth in the following description or illustrated in the drawings. The Combination Fire Pit, Grill and Cooking Wok is capable of other embodiments and of being practiced and carried out in various ways. Also, it is to be understood that the phraseology and terminology employed herein are for the purpose of description and should not be regarded as limiting.

SUMMARY OF THE INVENTION

The preferred embodiment of the Combination Fire Pit, Grill, Pizza Oven and Cooking Wok includes the features of having a combination fire pit, grill, pizza oven and cooking wok assembly which is provided in a single compact portable unit, having a liquid propane (LP) gas hose connection, a gas ignitor/control unit and control knob, a base frame for supporting a fire pit housing barrel, a fire pit housing barrel for holding pumice rocks and for supporting a grill grate, a burner ring housed within the fire pit housing barrel, and a grill grate, all topped with a wok lid with handles which is secured to the fire pit housing barrel using lid clamps. When the combination fire pit, grill, pizza oven and cooking wok unit is in storage or being transported, the wok top is inverted and secured to the unit. When in use as a fire pit, the wok lid is taken off and the grill grate removed. When in use as a cooking wok, the cooking wok lid is taken off the unit, inverted to be positioned cook-side up, then placed back on the unit when the cooking fire is started. When in use as a pizza oven, the cooking wok is left on the fire barrel in the upside down position. Alternatively, just the grill grate can be used to cook food items by grilling. In addition to using liquid propane (LP) as a power source, the combination fire pit, grill, pizza oven and cooking wok assembly could be used with a conventional wood or charcoal fire.

The primary advantage of the Combination Fire Pit, Grill, Pizza Oven and Cooking Wok is that it will function as a fire pit, a barbeque grill, a pizza oven, and a cooking wok, all in one compact portable unit.

Another advantage of the Combination Fire Pit, Grill, Pizza Oven and Cooking Wok is that it can function as an open fire pit having LP gas or wood or charcoal as a heating source.

Yet another advantage of the Combination Fire Pit, Grill, Pizza Oven and Cooking Wok is that it can function as a barbeque grill having LP gas or wood or charcoal as a heating source.

A further advantage of the Combination Fire Pit, Grill, Pizza Oven and Cooking Wok is that it can function as a pizza oven, when coupled with a pizza stone, having LP gas or wood or charcoal as a heating source.

Another advantage of the Combination Fire Pit, Grill, Pizza Oven and Cooking Wok is that it can function as a cooking wok having LP gas or wood or charcoal as a heating source.

Yet another advantage of the Combination Fire Pit, Grill, Pizza Oven and Cooking Wok is that the cooking wok functions as a lid when inverted and locks to the fire pit housing barrel defining an oven within the fire pit housing barrel.

These together with other advantages of the Combination Fire Pit, Grill, Pizza Oven and Cooking Wok, along with the various features of novelty, which characterize the design are pointed out with particularity in the claims annexed to and forming a part of this disclosure. For a better understanding of the Combination Fire Pit, Grill, Pizza Oven and Cooking Wok its operating advantages and the specific objects attained by its uses, reference should be made to the accompanying drawings and descriptive matter in which there are illustrated the preferred and alternate embodiments of the Combination Fire Pit, Grill, Pizza Oven and Cooking Wok. There has thus been outlined, rather broadly, the more important features of the design in order that the detailed description thereof that follows may be better understood, and in order that the present contribution to the art may be better appreciated. There are additional features of the Combination Fire Pit, Grill, Pizza Oven and Cooking Wok that will be described hereinafter, and which will form the subject matter of the claims appended hereto.

The preferred embodiment of the Combination Fire Pit, Grill, Pizza Oven and Cooking Wok will have a liquid propane (LP) gas hose connection, a gas ignitor/control unit and control knob, a base frame for supporting a fire pit housing barrel, a fire pit housing barrel for holding pumice rocks and for supporting a grill grate, a burner ring housed within the fire pit housing barrel, and a grill grate, all topped with a wok lid with handles which is secured to the fire pit housing barrel using lid clamps.

In alternate uses of the Combination Fire Pit, Grill, Pizza Oven and Cooking Wok when the combination fire pit, grill, pizza oven and cooking wok unit is in storage or being transported, the wok top is inverted and secured to the unit. When in use as a fire pit, the wok lid is taken off and the grill grate removed. When in use as a cooking wok, the cooking wok lid is taken off the unit, inverted to be positioned cook-side up, then placed back on the unit when the cooking fire is started. When in use as a pizza oven, the cooking wok is left on the fire barrel in the upside down or lid position. Alternatively, just the grill grate can be used to cook food items by grilling. In addition to using liquid propane (LP) as a power source, the combination fire pit, grill, pizza oven and cooking wok assembly could be used with a conventional wood or charcoal fire.

Combination Fire Pit, Grill, Pizza Oven and Cooking Wok primary features will include as prominent design and operational features (here listed by drawing figure reference characters):

10—combination fire pit, grill, pizza oven and cooking wok

12—fire pit housing barrel
14—barrel support base lower ring
16—barrel support base strut
17—barrel support base strut
18—barrel center post pedestal

19—barrel support base strut
20—base saucer disk
21—base saucer disk support pedestal
22—ignition/gas control unit
24—ignition/gas control knob
25—ignition/gas control knob connection shaft
26—decorative air intake vents
27—ignition/gas control gas source hose connection
28—decorative air intake vents
30—cooking wok/lid assembly
32—wok handle
33—wok handle
34—barrel support base upper ring
36—base ring connection tab with orifice
37—base ring connection tab with orifice
38—wok locking hook
39—base ring connection tab with orifice
40—burner ring
41—wok locking hook
42—vented barrel floor plate
43—ignition box
44—vented barrel base plate saucer plurality of vents
45—burner ring plurality of orifices
46—vented barrel base plate saucer large vent
47—ignition box plurality of orifices
48—burner ring air/gas intake pipe
50—burner ring support tab
51—burner ring support tab
52—grill grate
53—burner ring support tab
54—saucer disk central orifice
55—saucer disk orifice With respect to the above description then, it is to be realized that the optimum dimensional relationships for the parts of the Combination Fire Pit, Grill, Pizza Oven and Cooking Wok, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present design. Therefore, the foregoing is considered as illustrative only of the principles of the Combination Fire Pit, Grill, Pizza Oven and Cooking Wok. Further, since numerous modifications and changes will readily occur to those skilled in the art, it is not desired to limit the Combination Fire Pit, Grill, Pizza Oven and Cooking Wok to the exact construction and operation shown and described, and accordingly, all suitable modifications and equivalents may be resorted to falling within the scope of this application.

BRIEF DESCRIPTION OF THE DRAWINGS

The accompanying drawings, which are incorporated in and form a part of this specification, illustrate embodiments of the Combination Fire Pit, Grill, Pizza Oven and Cooking Wok and together with the description, serve to explain the principles of this application.

FIG. 3 depicts a front view of the control knob removed from the ignition/gas control unit.

FIG. 4 depicts a front, side and perspective view of the ignition/gas control unit adjacent to a partial view of the burner ring intake pipe.

FIG. 5 depicts a front view of the fire pit housing barrel, illustrating the position and design of the decorative vents therein.

FIG. 6 depicts a rear view of the fire pit housing barrel, illustrating the position and design of the decorative vents therein.

DETAILED DESCRIPTION OF THE PREFERRED EMBODIMENTS

As required, the detailed embodiments of the present Combination Fire Pit, Grill, Pizza Oven and Cooking Wok 10 are disclosed herein, however, it is to be understood that the disclosed embodiments are merely exemplary of the design that may be embodied in various forms. Therefore, specific functional and structural details disclosed herein are not to be interpreted as limiting, but merely as basic for the claims and as a representative basis for teaching one skilled in the art to variously employ the present design in virtually any appropriately detailed structure as well as combination.

Figure 1:
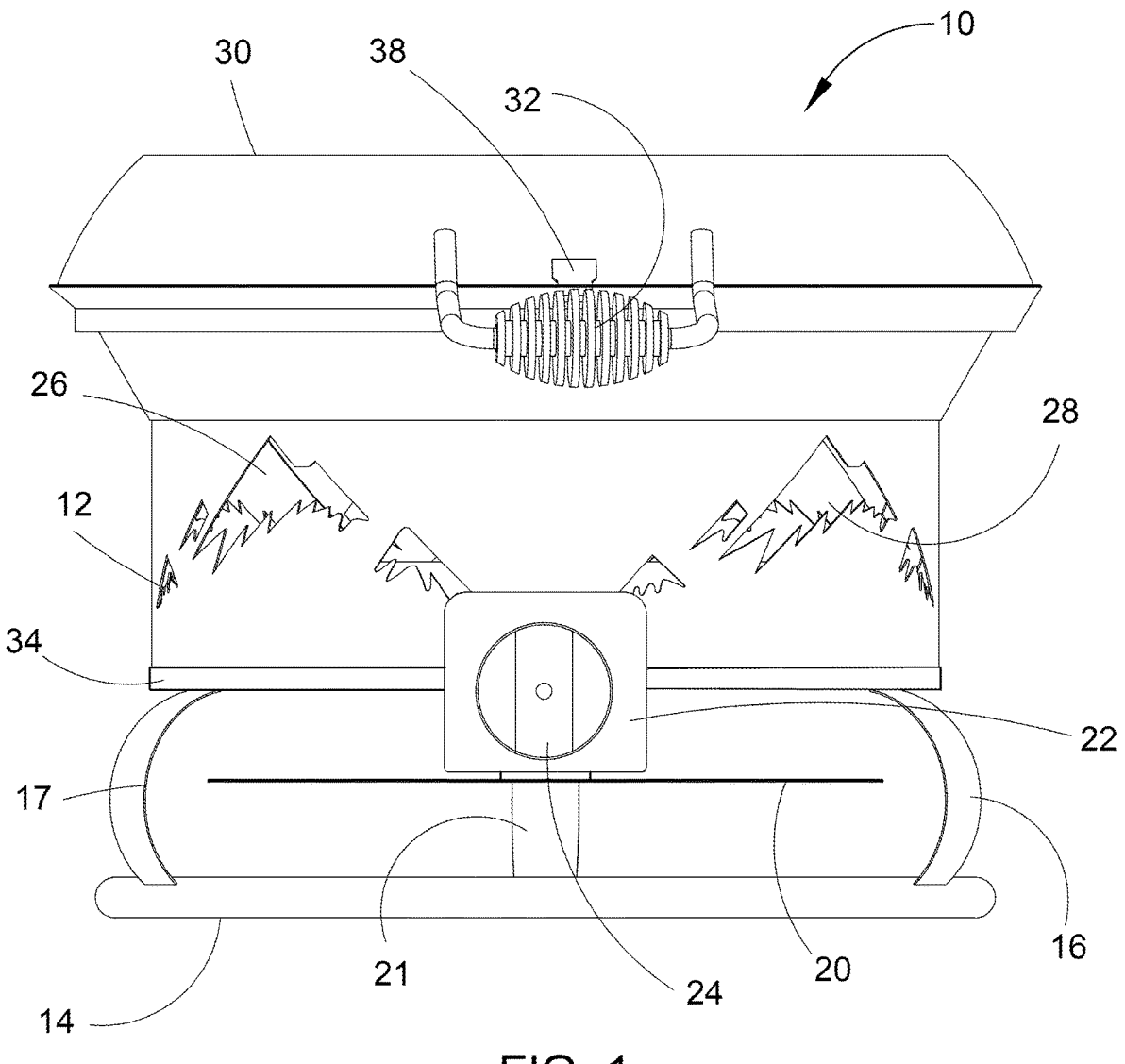
FIG. 1 depicts a front view of the Combination Fire Pit, Grill, Pizza Oven and Cooking Wok single compact portable unit assembly illustrating the cooking wok in the inverted position acting as a lid.

Referring now to FIG. 1 there is shown a front view of the Combination Fire Pit, Grill, Pizza Oven and Cooking Wok single compact portable unit 10 fully assembled and illustrating the cooking wok 30 in the inverted position acting as a lid thereon. The fully assembled unit 10 includes a fire pit housing barrel 12, supported by a barrel support base comprising a barrel support base ring 14, barrel support base struts 16, 17 and 19 (19 is not seen in this view, see FIG. 2), and barrel support base upper ring, on which the fire pit housing barrel 12 rests. The cooking wok/lid 30 includes wok handles 32 and 33 (33 is not seen in this view, see FIG. 2) and wok locking hooks 38 and 41 (41 not seen in this view, see FIGS. 16-18). The assembled unit 10 also includes an ignition/gas control unit 22 and an ignition/gas control knob 24. Also seen in this FIG. 1 view of the assembled unit 10 are the decorative air intake vents 26 and 28 located in the fire pit housing barrel 12. A base saucer disk and base saucer disk 20 support pedestal 21 are centrally located within the support base between the support base lower ring 14 and the support base upper ring 34. When in use as a fire pit, the assembled unit would have the cooking wok/lid 30 removed and no grill grate on the fire pit housing barrel 12. In order to use the assembled unit 10 as a grill, the cooking wok/lid 30 would be removed and the grill grate (see FIG. 13) would be placed on top of the fire pit housing barrel 12. In order to be used as an oven, or a pizza oven, the cooking wok/lid would be inverted as shown here in FIG. 1 and a pizza stone (not shown) placed on the grill grate located on the top of the fire pit housing barrel 12.

Figure 2:
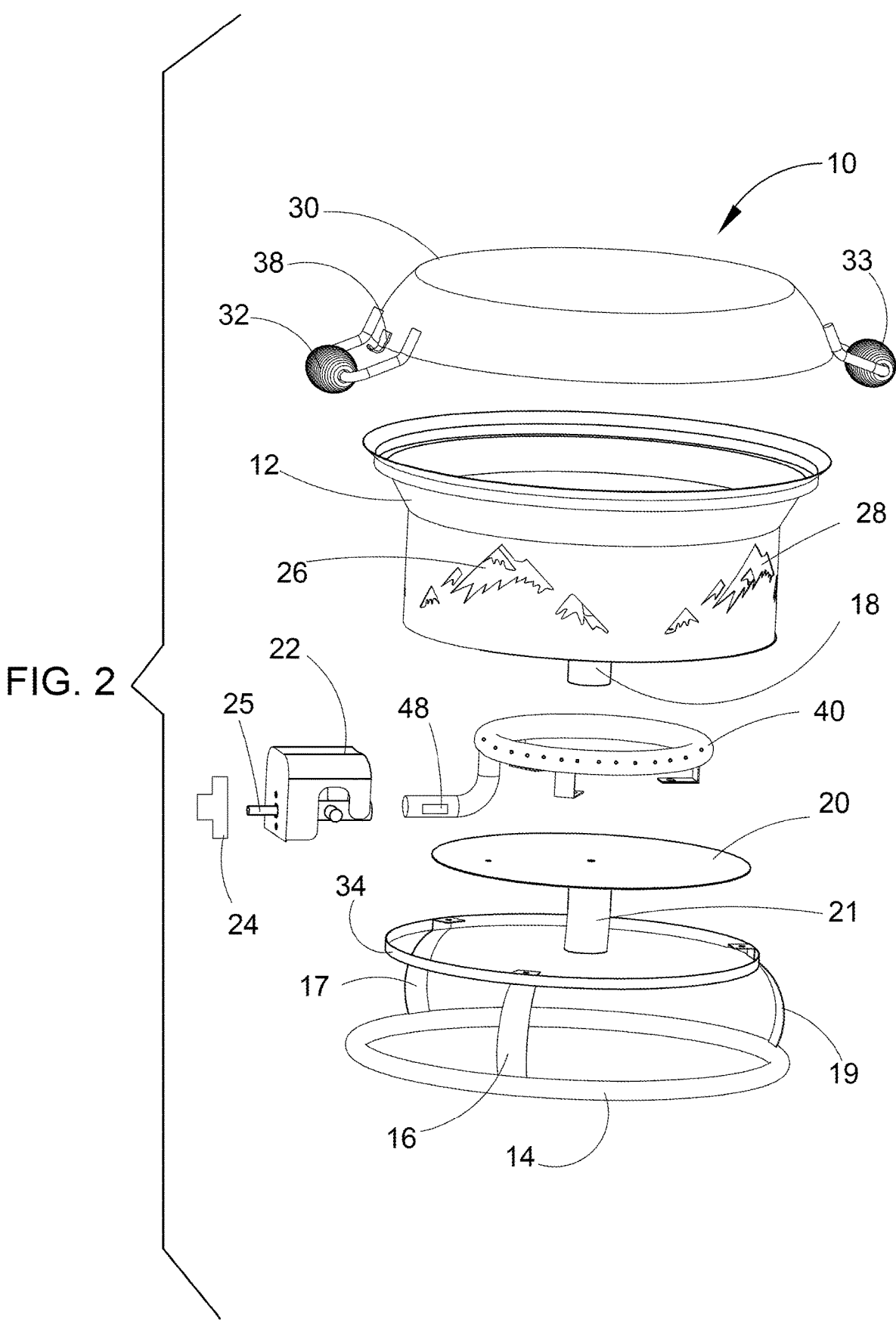
FIG. 2 depicts an exploded top, side and front view of the Combination Fire Pit, Grill, Pizza Oven and Cooking Wok single compact portable unit assembly illustrating the cooking wok in the inverted position acting as a lid and showing many of the internal parts therein.

FIG. 2 depicts an exploded top, side and front view of the Combination Fire Pit, Grill, Pizza Oven and Cooking Wok single compact portable unit 10 assembly parts illustrating the cooking wok 30 in the inverted position acting as a lid, and showing many of the internal parts therein. The fully assembled unit 10 includes a fire pit housing barrel 12, supported by a barrel support base comprising a barrel support base ring 14, barrel support base struts 16, 17 and 19, and barrel support base upper ring, on which the fire pit housing barrel 12 rests. The cooking wok/lid 30 includes wok handles 32 and 33 and wok locking hooks 38 and 41 (41 not seen in this view, see FIGS. 16-18). The assembled unit 10 also includes an ignition/gas control unit 22 and an ignition/gas control knob 24. Also seen in this FIG. 1 view of the assembled unit 10 are the decorative air intake vents 26 and 28 located in the fire pit housing barrel 12. A base saucer disk and base saucer disk 20 support pedestal 21 are centrally located within the support base between the support base lower ring 14 and the support base upper ring 34. Here is seen more detail of the ignition/gas control unit 22 which includes an ignition/gas control knob connection shaft 25 for mounting the ignition/gas control knob 24. The burner ring 40 is shown as well as the burner ring air/gas intake pipe 48. Also seen in this FIG. 1 view of the assembled unit 10 is the fire pit housing barrel 12 pedestal 18 which rests on base saucer disk 20 and is supported by the base saucer disk support pedestal 21 when assembled.

FIG. 3 depicts a front view of the control knob removed from the ignition/gas control unit. This ignition/gas control knob 24 is removably attached to the ignition/gas control unit 22 (see FIG. 4). The ignition/gas control knob 24 has an ergonomically shaped protrusion on the front surface for ease of use and to accommodate readily turning the ignition/gas control knob 24.

FIG. 4 depicts an enlarged front, side and perspective view of the ignition/gas control unit 22 adjacent to a partial view of the burner ring intake pipe 48. This ignition/gas control unit 22 is a conventional ignition and gas control unit commonly found on many fire pits and grills. The ignition/gas control unit 22 has an ignition/gas control gas source hose connection 27 which is a conventional ignition/gas control gas source hose connection commonly used to connect fire pits and grills to a propane (LP) source, such as an LP tank, and it accepts a conventional LP hose. This ignition/gas control unit 22 also includes a conventional ignition system which when turned sparks and allows for ignition of the gas when gas is flowing into the ignition/gas control unit 22 through the source hose and into the ignition/gas control gas source hose connection 27 then into the burner 40 (not shown, see FIG. 12) through the burner ring air/gas intake pipe 48.

FIG. 5 depicts a front view of the fire pit housing barrel 12, illustrating the position and design of the decorative air intake vents 26 and 28 therein. This view in FIG. 5 also shows the centrally located barrel center post pedestal 18.

FIG. 6 depicts a rear view of the fire pit housing barrel 12, illustrating the position and design of the decorative air intake vents 26 and 28 therein. This view in FIG. 5 also shows the centrally located barrel center post pedestal 18. The design of the decorative air intake vents shown integrated into the fire pit housing barrel 12 here have a snow-capped mountain theme, however, it is anticipated that the decorative air intake vents 26 and 28 may vary in design and be integrated in other themes and motifs.

Figure 7:
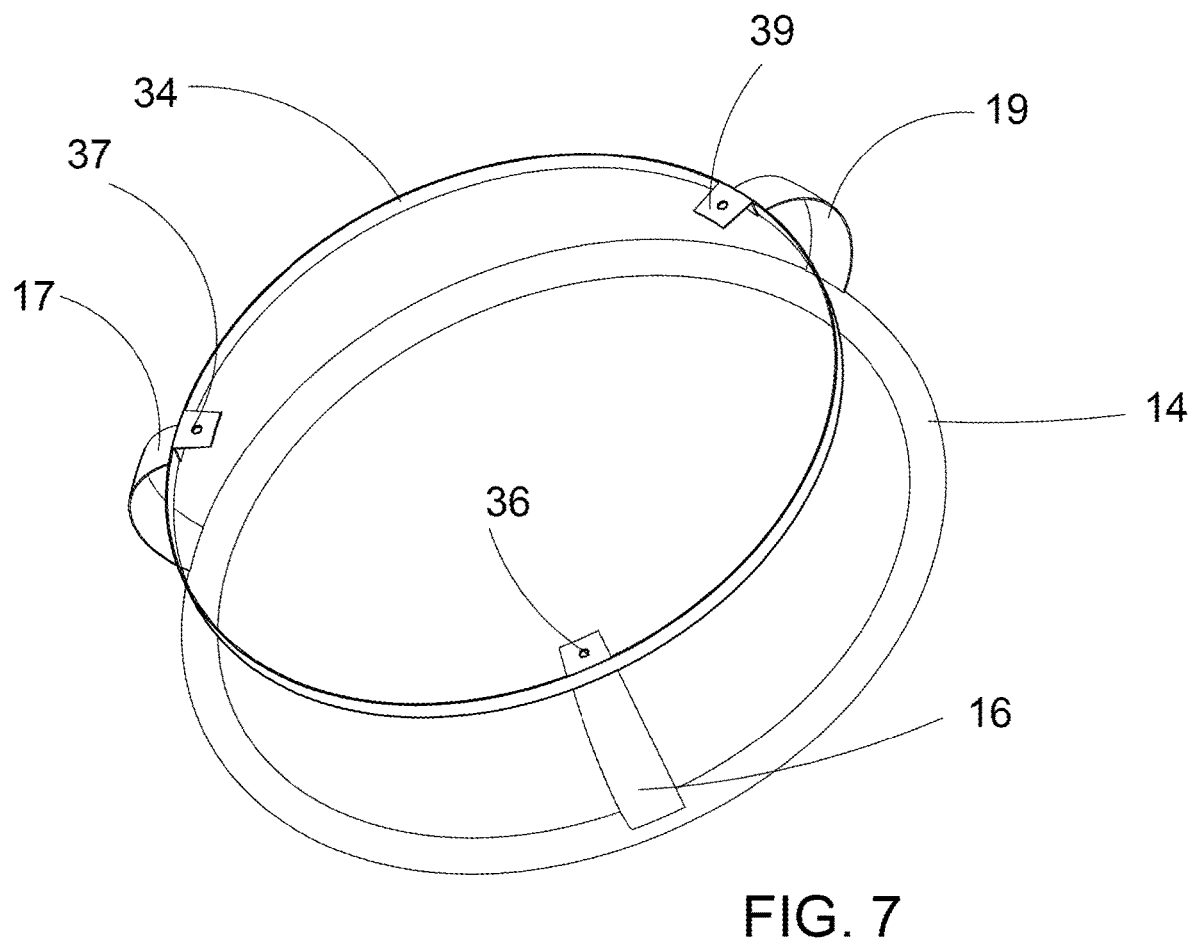
FIG. 7 depicts a perspective view of the fire pit barrel support base structure.

FIG. 7 depicts a perspective view of the fire pit barrel 12 support base structure including barrel support base lower ring 14, barrel support base upper ring 34 as supported by barrel support base struts 16, 17 and 19. Integrated into the upper portion of each of the barrel support base struts 16, 17 and 19 is a base ring connection tab with orifice 36, 37 and 39, respectively. These base ring connection tabs with orifices 36, 37 and 39 are used to secure the fire pit housing barrel 12 to the base support structure using nuts and bolts or some other suitable fastening means (not shown).

Figure 8:
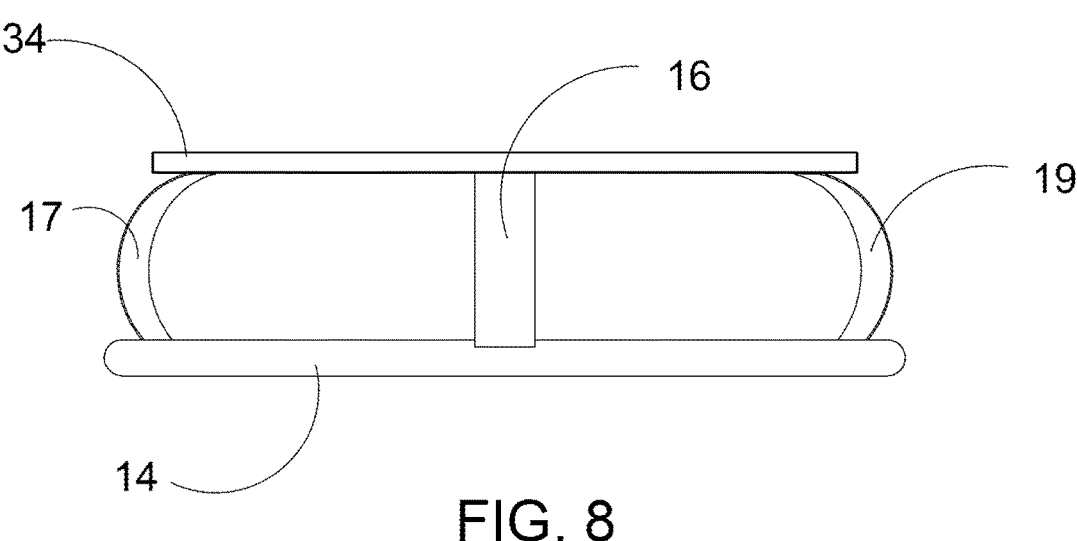
FIG. 8 depicts a side elevational view of the fire pit barrel support base structure.

FIG. 8 depicts a side elevational view of the fire pit barrel 12 support base structure including barrel support base lower ring 14, barrel support base upper ring 34 as supported by barrel support base struts 16, 17 and 19.

Figure 9:
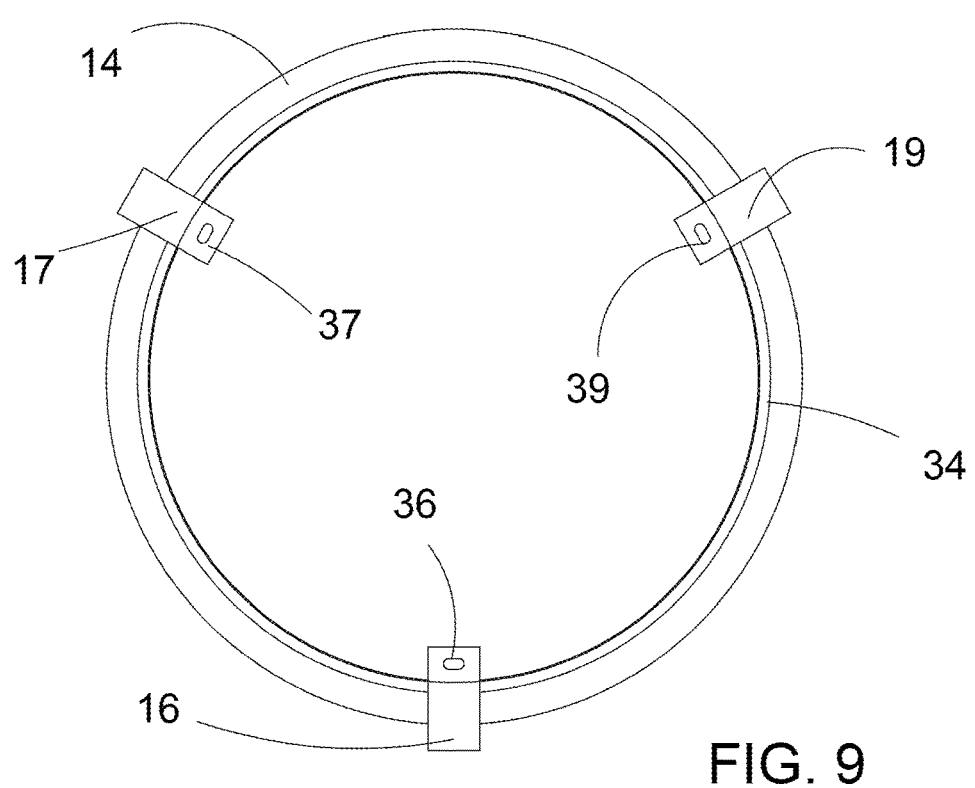
FIG. 9 depicts a top plan view of the fire pit barrel support base structure.

FIG. 9 depicts a top plan view of the fire pit barrel 12 support base structure including barrel support base lower ring 14, barrel support base upper ring 34 as supported by barrel support base struts 16, 17 and 19. Integrated into the upper portion of each of the barrel support base struts 16, 17 and 19 is a base ring connection tab with orifice 36, 37 and 39, respectively. These base ring connection tabs with orifices 36, 37 and 39 are used to secure the fire pit housing barrel 12 to the base support structure using nuts and bolts or some other suitable fastening means (not shown).

Figure 10:
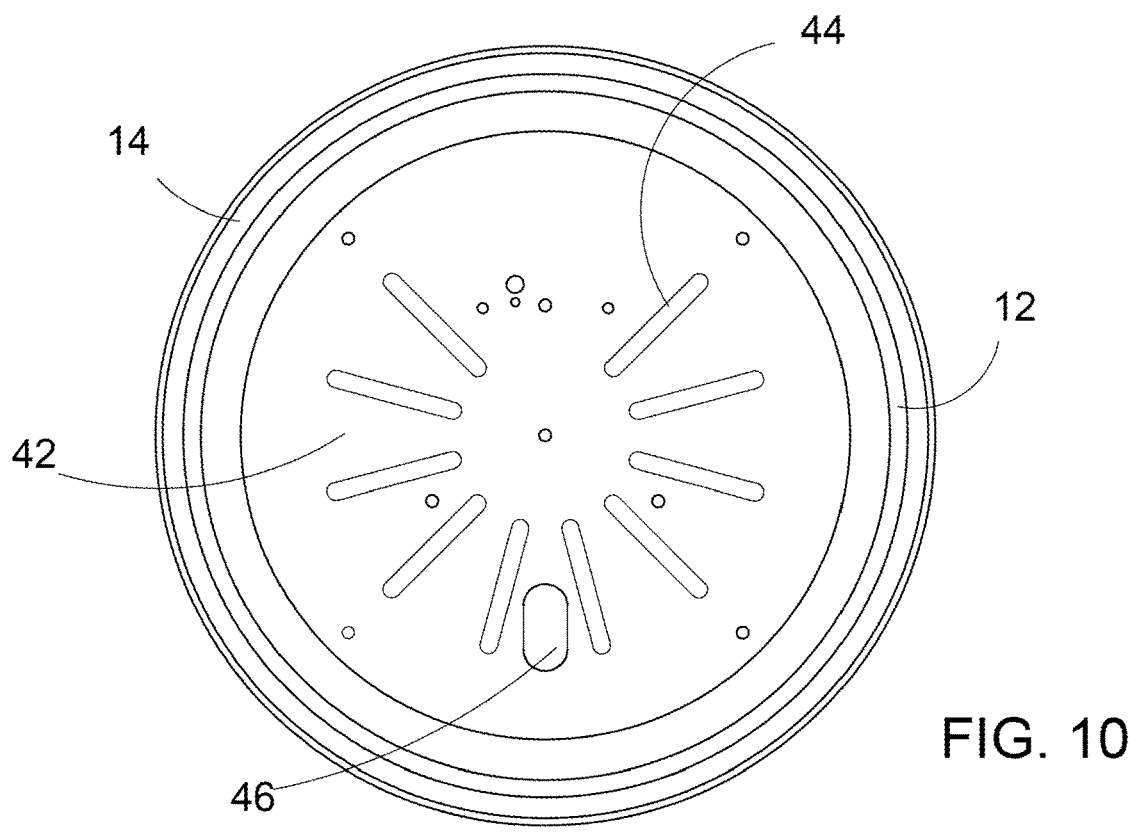
FIG. 10 depicts a top plan view of the fire pit barrel illustrating the vented barrel base plate saucer having vents therein.

FIG. 10 depicts a top plan view of the fire pit barrel 12 illustrating the vented barrel base plate 42 having numerous and varying shaped vents 44 and 46 therein. The plurality of vents 44 and 46 have differing functions. Vents 44 and the like allow for the intake of air into the fire pit barrel when necessary to keep the LP sourced fire fueled with air for combustion. The larger vent 46 is used to allow the burner ring air/gas intake pipe 48 to extend from the ignition/gas control unit 22 upward into the fire pit barrel housing 12 above the vented barrel base plate 42. In this way, the burner 40 is mounted within the fire pit barrel housing 12, which is in turn mounted on the support base structure described in FIG. 9 above. When the burner 40 within the fire pit housing barrel 12 is ignited and supplied with gas, the burner 40 functions to generate a ring of fire flames, see FIGS. 11 and 12 below.

Figure 11:
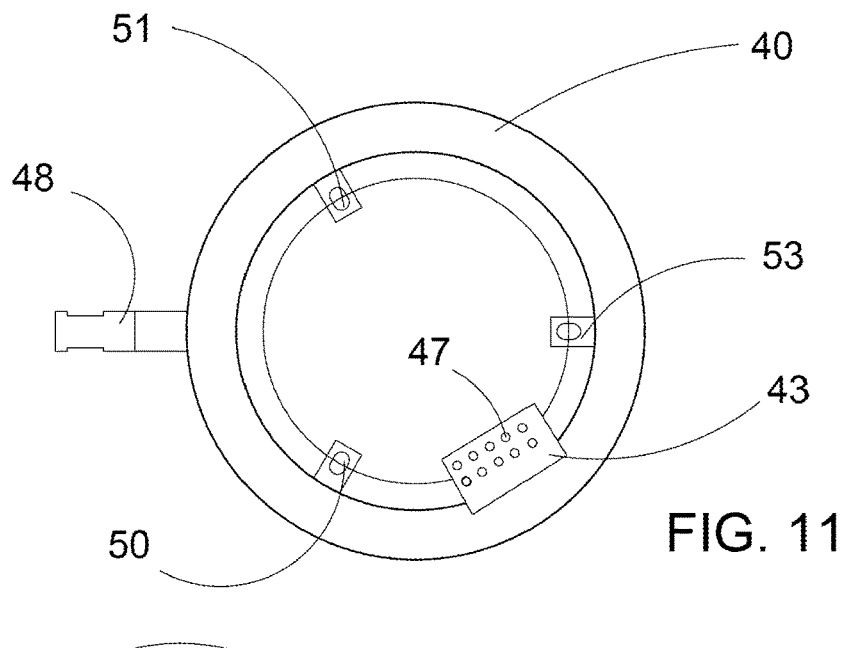
FIG. 11 depicts a bottom view of the burner ring having a burner ring air/gas intake pipe.

FIG. 11 depicts a bottom view of the burner ring 40 having a burner ring air/gas intake pipe 48. This view of FIG. 11 also illustrates the ignition box 43 having a plurality of ignition box orifices 47. This ignition box 43 is a conventional ignition box commonly found on grills and fire pits. When the ignition/gas control knob 24 on the ignition/gas control unit 22 is rotated it sends an electronic signal through wires (not shown) to a sparker device within the ignition box 43 which generates a spark to ignite the gas flowing into the burner ring 40 and out of the burner ring plurality of orifices 45 (see FIG. 12 below). Also shown here in FIG. 11 are the three burner ring support tabs 50, 51 and 53 which allow for the securing of the burner ring 40 to the vented barrel floor plate 42 within the fire pit barrel housing 12.

Figure 12:
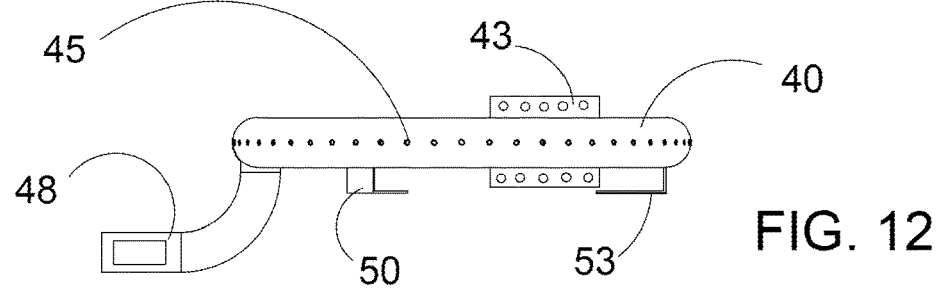
FIG. 12 depicts a side elevational view of the burner ring having a burner ring air/gas intake pipe.

FIG. 12 depicts a side elevational view of the burner ring 40 having a burner ring air/gas intake pipe 48. This view of FIG. 12 also illustrates the ignition box 43 having a plurality of ignition box orifices 47. This ignition box 43 is a conventional ignition box commonly found on grills and fire pits. When the ignition/gas control knob 24 on the ignition/gas control unit 22 is rotated it sends an electronic signal through wires (not shown) to a sparker device within the ignition box 43 which generates a spark to ignite the gas flowing into the burner ring 40 and out of the burner ring plurality of orifices 45. Also shown here in FIG. 12 are the three burner ring support tabs 50, 51 and 53 which allow for the securing of the burner ring 40 to the vented barrel floor plate 42 within the fire pit barrel housing 12. In this way, the burner ring 40 is secured within the fire pit barrel housing 12 using conventional fastening means, such as screws or nuts and bolts.

Figure 13:
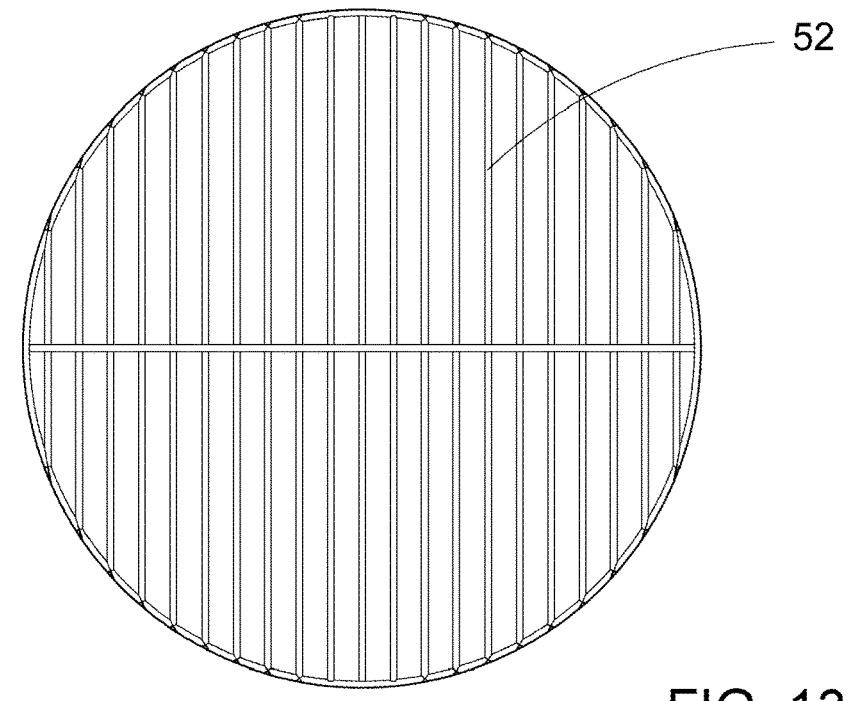
FIG. 13 depicts a top plan view of the grill grate.

FIG. 13 depicts a top plan view of the grill grate 52. The grill grate 52 is a conventional grill grate commonly used on grills. The grill grate fits on the top of the fire pit barrel housing 12. The addition of a grill grate 52 allows the user to grill foods on the assembled unit 10.

Figure 14:
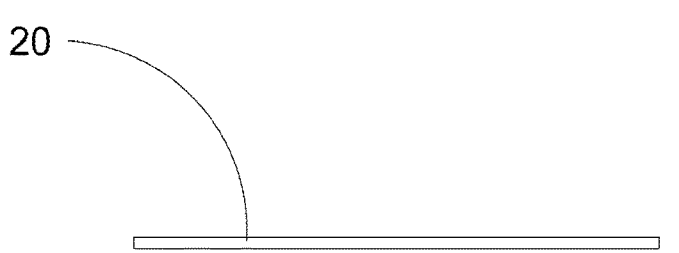
FIG. 14 depicts a side elevational view of the support base saucer disk.

FIG. 14 depicts a side elevational view of the support base saucer disk 20. This support base saucer disk 20 sits on a saucer disk pedestal 21 (see FIG. 2) and is centrally located directly below the fire pit barrel housing 12.

Figure 15:
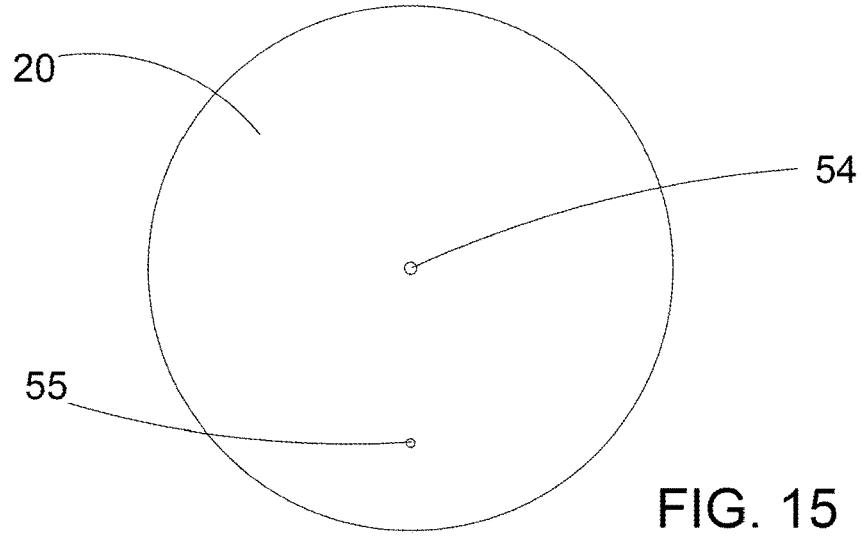
FIG. 15 depicts a top plan view of the support base saucer disk.

FIG. 15 depicts a top plan view of the support base saucer disk 20 illustrating the holes therein, namely centrally located hole 54 and peripherally located hole 55. Centrally located hole 54 allows the support base saucer disk 20 to be fastened to the saucer disk pedestal 21 using conventional fastening means, such as screws or nuts and bolts. The support base saucer disk 20 is centrally located directly below the fire pit barrel housing 12 for the purpose of catching ash or grease coming from the vented barrel floor plate 42 if any drops through the vented barrel base plate saucer plurality of vents 44. The support base saucer disk 20 is easily removed for cleaning.

Figure 16:
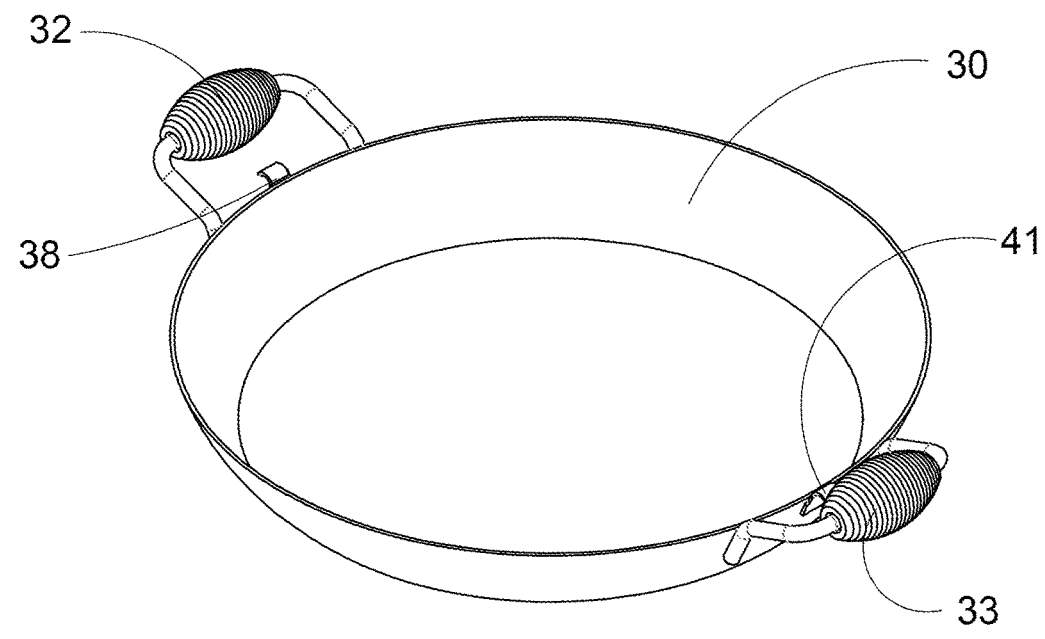
FIG. 16 depicts a top, side and perspective view of the cooking wok and lid.

FIG. 16 depicts a top, side and perspective view of the cooking wok and lid 30. This view illustrates the handles 32 and 33 as well as the locking hooks 38 and 41 located on the rim of the cooking wok and lid 30. The cooking wok handles 32 and 33 include heat dissipating handle extensions in the form of variable diameter spring-like structures, to ensure that the user is not burned when handling the cooking wok/lid 30 when it is hot during use as a wok, frying pan, oven or pizza oven, when the assembly unit 10 used in conjunction with a pizza stone.

Figure 17:
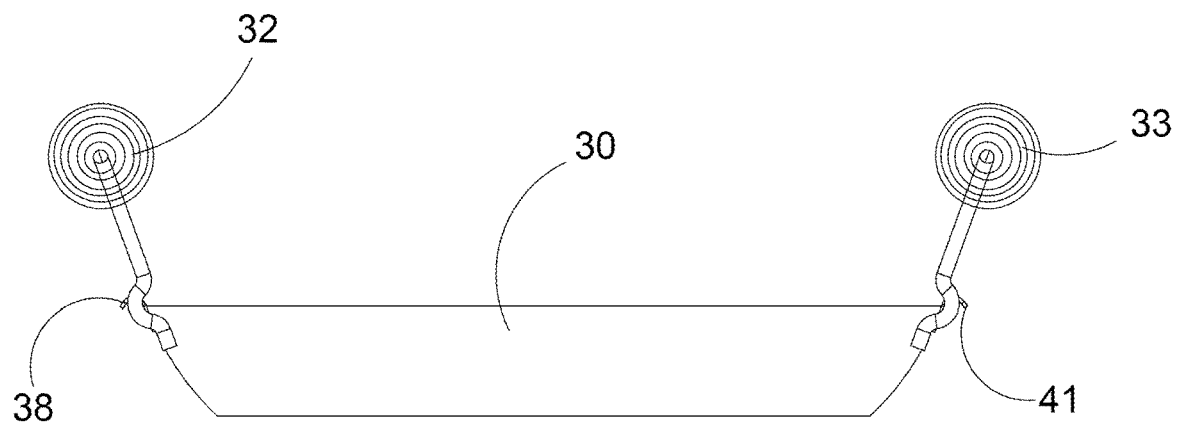
FIG. 17 depicts a side elevational view of the cooking wok and lid.

FIG. 17 depicts a side elevational view of the cooking wok and lid 30, again illustrating the handles 32 and 33 as well as the locking hooks 38 and 41 located on the rim of the cooking wok and lid 30. The cooking wok/lid 30 is shown here as a flat bottom frying pan type of wok, but it is also anticipated that the cooking wok/lid 30 could be configured as a traditional Asian wok with a round or rounded bottom surface.

Figure 18:
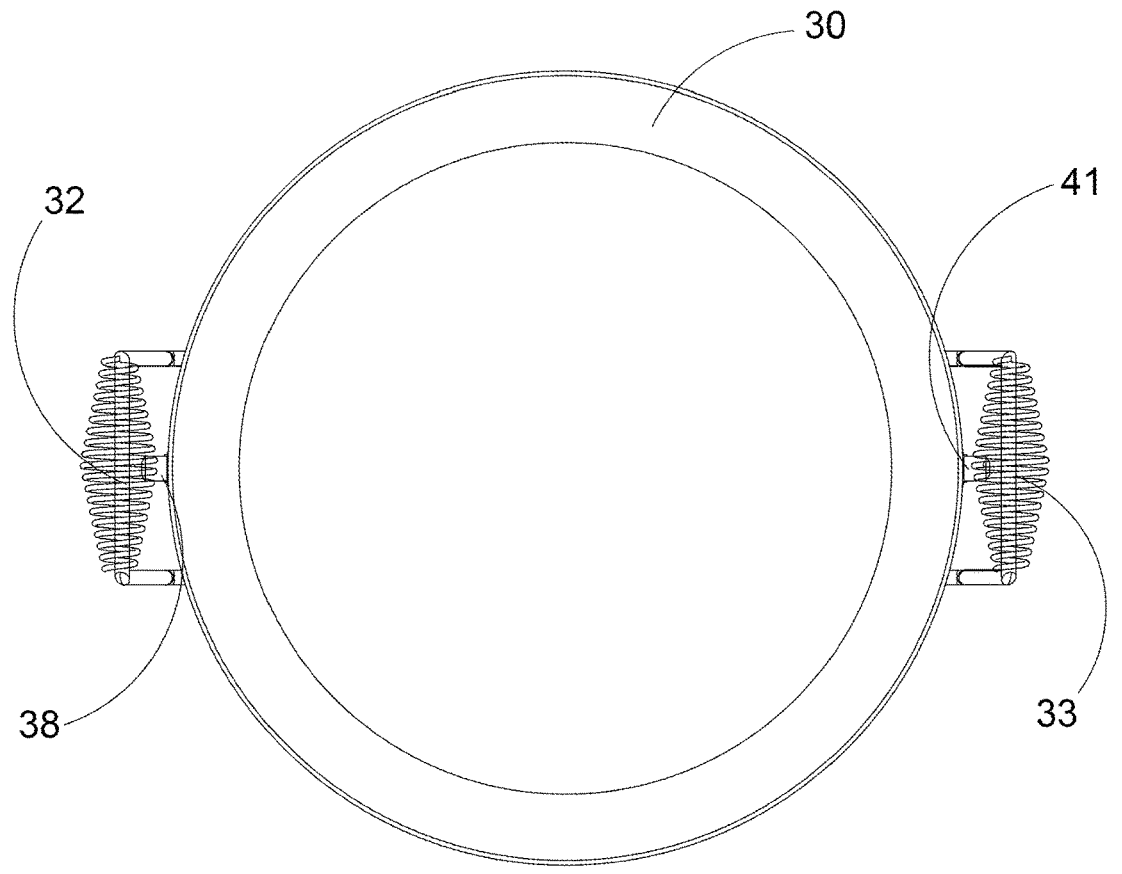
FIG. 18 depicts a top plan view of the cooking wok and lid.

FIG. 18 depicts a top plan view of the cooking wok and lid 30, again illustrating the handles 32 and 33 as well as the locking hooks 38 and 41 located on the rim of the cooking wok and lid 30. The locking hooks 38 and 41 could correspond to locking levers found on the fire pit barrel housing 12 (not shown). Alternatively, a rope or bungee cord could be used to secure the cooking wok/lid 30 to the fire pit barrel housing 12 for the purpose of storing or transporting the assembled unit 10.

In summary, the Combination Fire Pit, Grill, Pizza Oven and Cooking Wok primary features will include as prominent design and operational features: a fire pit housing barrel having decorative air intake vents, a barrel support base lower ring, a barrel support base strut, three or more barrel support base struts, a barrel center post pedestal, a base saucer disk having a saucer disk central orifice and a saucer disk peripheral orifice, a base saucer disk support pedestal, an ignition/gas control unit having an ignition/gas control knob, an ignition/gas control knob connection shaft and an ignition/gas control gas source hose connection, a cooking wok/lid assembly having wok handles and lid locking hooks, a barrel support base structure having a barrel support base upper ring, three or more base ring connection tabs with orifices, a burner ring having a plurality of orifices, a vented barrel floor plate saucer, an ignition box having an ignition box plurality of orifices, a vented barrel base plate saucer including a plurality of vents, a vented barrel base plate saucer large vent, a burner ring air/gas intake pipe, three or more burner ring support tabs having orifices therein, and a grill grate.

The Combination Fire Pit, Grill, Pizza Oven and Cooking Wok 10 shown in the drawings and described in detail herein disclose arrangements of elements of particular construction and configuration for illustrating preferred embodiments of structure and method of operation of the present application. It is to be understood, however, that elements of different construction and configuration and other arrangements thereof, other than those illustrated and described may be employed for providing the Combination Fire Pit, Grill, Pizza Oven and Cooking Wok 10 in accordance with the spirit of this disclosure, and such changes, alternations and modifications as would occur to those skilled in the art are considered to be within the scope of this design as broadly defined in the appended claims.

While certain embodiments of the inventions have been described, these embodiments have been presented by way of example only, and are not intended to limit the scope of the disclosure. Indeed, the novel methods and systems described herein may be embodied in a variety of other forms. Furthermore, various omissions, substitutions and changes in the systems and methods described herein may be made without departing from the spirit of the disclosure. For example, one portion of one of the embodiments described herein can be substituted for another portion in another embodiment described herein. The accompanying claims and their equivalents are intended to cover such forms or modifications as would fall within the scope and spirit of the disclosure. Accordingly, the scope of the present inventions is defined only by reference to the appended claims.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally,"

and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, or 0.1 degree.

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Further, the purpose of the foregoing abstract is to enable the U.S. Patent and Trademark Office, foreign patent offices worldwide and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

I claim:

1. A portable combination fire pit, grill, pizza oven and cooking wok, comprising:
   (a) a base support frame having a lower base support ring, an upper base support ring and base support struts located between said lower ring and said upper ring;
   (b) a fire pit housing barrel having an upper portion and including a vented floor plate, wherein said fire pit housing barrel is supported by said base support frame;
   (c) a burner ring located within said fire pit housing barrel; and
   (d) a cooking wok/lid member removably attached to said fire pit housing barrel upper portion including two cooking wok/lid handles having heat dissipating handle extensions in the form of variable diameter spring-like structures, and further wherein said heat dissipating handle extensions are configured to be directly adjacent to two locking hooks wherein said two locking hooks correspond to two locking levers located on the fire pit barrel housing upper portion for the purpose of locking and securing said cooking wok/lid to said upper portion of said fire pit barrel housing, enabling hand carrying of the portable combination fire pit, grill, pizza oven and cooking wok;
   wherein when said cooking wok/lid member is removed the fire pit housing barrel is used as a fire pit, and when said cooking wok/lid member is placed in the upright position the fire pit housing barrel is used as a cooking wok for cooking and frying food, and when said cooking wok/lid member is placed in the inverted position the fire pit housing barrel is used as an oven, a pizza oven and a fire pit housing barrel hand carrying enabled configured lid for storing and facilitating transporting by hand using said heat dissipating handle extensions and said locking hooks correspond to two locking levers located on the fire pit barrel housing.

2. The portable combination fire pit, grill, pizza oven and cooking wok according to claim 1, wherein said burner ring includes a burner ring air/gas intake pipe and a plurality of orifices.

3. The portable combination fire pit, grill, pizza oven and cooking wok according to claim 2, wherein said burner ring air/gas intake pipe is in communication with an ignition/gas control unit having an ignition/gas control knob, and further wherein said ignition/gas control unit includes a gas source hose connection for the purpose of supplying flammable gas to said burner ring.

4. The portable combination fire pit, grill, pizza oven and cooking wok according to claim 1, wherein the cooking wok/lid member further includes two heat dissipating handle extensions in the form of variable diameter spring-like structures, comprising metal spring coils.

5. The combination fire pit, grill, pizza oven and cooking wok according to claim 1, wherein the cooking wok/lid member further includes two locking hooks correspond to two locking levers located on the fire pit barrel housing upper portion, comprising metal lever lock locking mechanisms for the purpose of locking said cooking wok/lid to said upper portion of said fire pit housing barrel.

6. The portable combination fire pit, grill, pizza oven and cooking wok according to claim 3, wherein said burner ring includes an ignition box having a plurality of orifices therein, and further wherein said ignition box is in communication with said ignition/gas control unit and configured to spark in order to ignite a flame when gas is supplied to said burner ring.

7. The portable combination fire pit, grill, pizza oven and cooking wok according to claim 1, further including a removable grill grate wherein said grill grate is supported by said fire pit housing barrel upper portion.

8. The portable combination fire pit, grill, pizza oven and cooking wok according to claim 7, wherein said grill grate will accommodate a pizza stone, and when said cooking wok/lid member is placed in the inverted position the fire pit housing barrel is capable of being used as a pizza oven.

9. The portable combination fire pit, grill, pizza oven and cooking wok according to claim 1, wherein said base support frame further includes a centrally located saucer disk supported by a saucer disk pedestal, wherein said saucer disk is configured to catch ash and grease dropping through said fire pit housing barrel vented floor plate.

10. The portable combination fire pit, grill, pizza oven and cooking wok according to claim 1, wherein said base support frame having a lower base support ring and an upper base support ring includes three or more base support struts located between said lower ring and said upper ring, and further wherein said fire pit housing barrel is configured to be securely fastened to said base support frame upper base support ring.

11. A method for making a portable combination fire pit, grill, pizza oven and cooking wok, comprising the steps of:
   (a) providing a base support frame having a lower base support ring, an upper base support ring and base support struts located between said lower ring and said upper ring;
   (b) providing a fire pit housing barrel having an upper portion and including a vented floor plate, wherein said fire pit housing barrel is supported by said base support frame;
   (c) providing a burner ring located within said fire pit housing barrel; and
   (d) providing a cooking wok/lid member removably attached to said fire pit housing barrel upper portion including two cooking wok/lid handles having heat dissipating handle extensions in the form of variable diameter spring-like structures, and further wherein said heat dissipating handle extensions are configured to be directly adjacent to two locking hooks wherein said two locking hooks correspond to two locking levers located on the fire pit barrel housing upper portion for the purpose of locking and securing said cooking wok/lid to said upper portion of said fire pit barrel housing, enabling hand carrying of the portable combination fire pit, grill, pizza oven and cooking wok; wherein when said cooking wok/lid member is removed the fire pit housing barrel is used as a fire pit, and when said cooking wok/lid member is placed in the upright position the fire pit housing barrel is used as a cooking wok for cooking and frying food, and when said cooking wok/lid member is placed in the inverted position the fire pit housing barrel is used as an oven, a pizza oven and a fire pit housing barrel hand carrying enabled configured lid for storing and facilitating transporting by hand using said heat dissipating handle extensions and said locking hooks correspond to two locking levers located on the fire pit barrel housing.

12. The method of making a portable combination fire pit, grill, pizza oven and cooking wok according to claim 11, wherein said burner ring includes a burner ring air/gas intake pipe and a plurality of orifices.

13. The method of making a portable combination fire pit, grill, pizza oven and cooking wok according to claim 12, wherein said burner ring air/gas intake pipe is in communication with an ignition/gas control unit having an ignition/gas control knob, and further wherein said ignition/gas control unit includes a gas source hose connection for the purpose of supplying flammable gas to said burner ring.

14. The method of making a portable combination fire pit, grill, pizza oven and cooking wok according to claim 11, wherein the cooking wok/lid member further includes two heat dissipating handle extensions in the form of variable diameter spring-like structures, comprising metal spring coils.

15. The method of making a portable combination fire pit, grill, pizza oven and cooking wok according to claim 11, wherein the cooking wok/lid member further includes two locking hooks correspond to two locking levers located on the fire pit barrel housing upper portion, comprising metal lever lock locking mechanisms for the purpose of locking said cooking wok/lid to said upper portion of said fire pit housing barrel.

16. The method of making a portable combination fire pit, grill, pizza oven and cooking wok according to claim 13, wherein said burner ring includes an ignition box having a plurality of orifices therein, and further wherein said ignition box is in communication with said ignition/gas control unit and configured to spark in order to ignite a flame when gas is supplied to said burner ring.

17. The method of making a portable combination fire pit, grill, pizza oven and cooking wok according to claim 11, further including a removable grill grate wherein said grill grate is supported by said fire pit housing barrel upper portion.

18. The method of making a portable combination fire pit, grill, pizza oven and cooking wok according to claim 17, wherein said grill grate will accommodate a pizza stone, and when said cooking wok/lid member is placed in the inverted position the fire pit housing barrel is capable of being used as a pizza oven.

19. The method of making a portable combination fire pit, grill, pizza oven and cooking wok according to claim 11, wherein said base support frame further includes a centrally located saucer disk supported by a saucer disk pedestal, wherein said saucer disk is configured to catch ash and grease dropping through said fire pit housing barrel vented floor plate.

20. The method of making a portable combination fire pit, grill, pizza oven and cooking wok according to claim 11, wherein said base support frame having a lower base support ring and an upper base support ring includes three or more base support struts located between said lower ring and said upper ring, and further wherein said fire pit housing barrel is configured to be securely fastened to said base support frame upper base support ring.

* * * * *